United States Patent
Klingler

(10) Patent No.: US 6,805,680 B2
(45) Date of Patent: Oct. 19, 2004

(54) METHOD FOR PROVIDING A MASSAGE ON SEATS, AND A DEVICE FOR IMPLEMENTING THIS METHOD

(75) Inventor: Knud Klingler, Nürnberg (DE)

(73) Assignee: Schukra-Geratebau AG, Nuremburg (DE)

( * ) Notice: Subject to any disclaimer, the term of this patent is extended or adjusted under 35 U.S.C. 154(b) by 22 days.

(21) Appl. No.: 09/944,294

(22) Filed: Aug. 30, 2001

(65) Prior Publication Data

US 2002/0032395 A1 Mar. 14, 2002

Related U.S. Application Data

(63) Continuation-in-part of application No. 09/105,353, filed on Jun. 26, 1998, which is a continuation-in-part of application No. 09/002,809, filed on Jan. 5, 1998, which is a continuation of application No. 08/545,602, filed on Oct. 30, 1995, now Pat. No. 5,704,687.

(30) Foreign Application Priority Data

Dec. 9, 1994 (DE) .......... P44 43 928

(51) Int. Cl.$^7$ .............. A61H 15/00
(52) U.S. Cl. .......... 601/115; 601/15; 601/52; 601/99
(58) Field of Search .......... 601/97–101, 115, 601/116, 122–123, 128, 133, 131, 52; 297/284.4

(56) References Cited

U.S. PATENT DOCUMENTS

| | | | | |
|---|---|---|---|---|
| 2,922,416 A | * | 1/1960 | Fader | .......... 601/116 |
| 3,405,709 A | | 10/1968 | Mathers | .......... 128/33 |

(List continued on next page.)

FOREIGN PATENT DOCUMENTS

| | | | |
|---|---|---|---|
| AT | 396055 | 12/1989 | .......... 297/284.4 |
| DE | 2040794 | 7/1971 | .......... 297/284.4 |
| DE | 2345254 | 4/1974 | .......... 297/284.4 |
| DE | 2804703 | 8/1979 | .......... 297/284.4 |
| GB | 2013487 | 8/1979 | .......... 297/284.4 |
| SU | 587924 | 1/1978 | .......... 297/284.4 |

OTHER PUBLICATIONS

Centro Mfg. Inc. Brochure (Apr., 1992) for Schukra Flexi–Cable.

Primary Examiner—Jerome W. Donnelly
(74) Attorney, Agent, or Firm—Dennis JM Donahue, III; Grant D. Kang; Husch & Eppenberger LLC

(57) ABSTRACT

This invention relates to an apparatus and method for providing a massage especially to the back areas of persons who have to sit for a relatively long time on seats, especially motor vehicle seats. The massage is achieved in accordance with the invention by a periodic or a continuous motion of massage elements placed in the seat surface and/or in the back rest. The massage elements are able to move in a forward and backward direction and an up and down direction with respect to the seat. The apparatus includes a supporting element formed of a flexible material that is positioned on a frame of the seat, a drive mechanism, a mechanism operatively connected to the drive mechanism to cause at least a portion of the supporting element to be bowed to provide movement of the supporting element in a direction toward and away from a person seated on the seat for the purpose of supporting body surfaces of the person on the seat. The supporting element includes massage elements, a control mechanism to drive the supporting element vertically and in a bowing movement to cause at least a portion of the supporting element to move forwardly and rearwardly all with respect to the seat whereby the massage elements are caused to moved to along in at least two directions at the same time.

23 Claims, 5 Drawing Sheets

U.S. PATENT DOCUMENTS

| | | | | |
|---|---|---|---|---|
| 3,762,769 A | | 10/1973 | Poschl | 297/284 |
| 4,153,293 A | | 5/1979 | Sheldon | 297/284 |
| 4,169,466 A | * | 10/1979 | Wong | 601/131 |
| 4,170,989 A | * | 10/1979 | Miniere | 601/102 |
| 4,316,631 A | | 2/1982 | Lenz et al. | 297/284.1 |
| 4,354,709 A | | 10/1982 | Schuster | 297/284.4 X |
| 4,601,514 A | | 7/1986 | Meiller | 297/284 |
| 4,627,661 A | | 12/1986 | Ronnhult et al. | 297/284.4 |
| 4,632,454 A | | 12/1986 | Naert | 297/284.4 |
| 4,880,271 A | | 11/1989 | Graves | 297/284.4 |
| 4,909,568 A | | 3/1990 | Dal Monte | 297/284.4 |
| 4,968,093 A | | 11/1990 | Dal Monte | 297/284.4 |
| 5,026,116 A | | 6/1991 | Dal Monte | 297/284.1 |
| 5,050,930 A | | 9/1991 | Schuster et al. | 297/284.4 |
| 5,105,490 A | * | 4/1992 | Shek | 5/693 |
| 5,197,780 A | * | 3/1993 | Coughlin | 297/284.7 |
| 5,217,278 A | | 6/1993 | Harrison et al. | 297/284.4 X |
| 5,330,416 A | | 7/1994 | Masuda et al. | 601/52 |
| 5,335,965 A | | 8/1994 | Sessini | 297/284.4 |
| 5,385,531 A | | 1/1995 | Jover | 297/284.1 X |
| 5,397,164 A | | 3/1995 | Schuster et al. | 297/284.4 |
| 5,423,593 A | | 6/1995 | Nagashima | 297/284.4 X |
| 5,518,294 A | * | 5/1996 | Ligon et al. | 297/284.4 |
| 5,567,011 A | * | 10/1996 | Sessini | 297/284.7 |
| 5,626,390 A | | 5/1997 | Schuster et al. | 297/284.4 |
| 5,651,583 A | | 7/1997 | Klingler et al. | 297/284.4 |
| 5,716,098 A | * | 2/1998 | Lance | 297/284.4 |
| 5,775,773 A | | 7/1998 | Schuster et al. | 297/284.4 |

* cited by examiner

METHOD FOR PROVIDING A MASSAGE ON SEATS, AND A DEVICE FOR IMPLEMENTING THIS METHOD

This application is a continuation in part of U.S. Ser. No. 09/105,353 filed on Jun. 26, 1998 which claimed priority to PCT/EP95/04827 and there through priority to DE P44 43 928.8 filed Dec. 9, 1994. This application also claims priority, through U.S. Ser. No. 09/105,353 as a continuation in part of Ser. No. 09/002,809, filed Jan. 5, 1998 which was a continuation of Ser. No. 08/545,602, filed Oct. 30, 1995 (now U.S. Pat. No. 5,704,687) which claimed priority through PCT/WO94/25307 which claimed priority to DE P43 14 325.3, filed on Apr. 30, 1993.

This invention relates to an apparatus adapted for mounting in seats, especially car seats, which has massage elements attached to it, and a method for assembling this apparatus.

Persons who have to remain seated for relatively long periods of time develop symptoms of fatigue and disturbed circulation, which as a whole have a negative effect on their well-being, concentration, and performance. In the case of relatively long automobile trips in particular, this is undesirable in terms of road safety. In fact it is recommended that people take rest breaks and engage in physical exercises every now and then, but this cannot always be done, for example in stoplight-controlled traffic, and finally it is not advisable to stop in the dark at freeway parking areas.

There are seats familiar to the art, in particular including motor-vehicle seats, that contain a vibrating mechanism. However, such vibrating mechanisms are not very effective, and often they transmit their vibrations also to other parts of a motor vehicle, and frequently this gives rise to unwelcome secondary effects.

Also familiar are motor-vehicle seats which in particular have a supporting element within the backrest, with this element being such that it can be bowed out to various degrees by means of a hand-driven or motor-driven apparatus, in order to provide an optimal support to the back areas of the car driver and/or front-seat passenger. This arching element can likewise be adjusted in height by a manual or motor drive in order to provide any desired accommodation to a person of any given size.

Also familiar to the art is a means for providing a supporting element over a bellows in the backrest of a motor-vehicle seat, with this bellows being periodically filled and emptied so that a forward-and-backward movement is transmitted to the areas of a person's back that are in contact with the backrest. However, this forward and backward movement is not very effective in terms of benefits to the person's circulation.

This invention relates to an apparatus adapted for mounting in seats, especially car seats, which has massage elements attached to it, and a method for assembling this apparatus. The apparatus has a resiliently flexible support element upon which are mounted a plurality of spindles. On this plurality of spindles are mounted a plurality of massage elements, which are rotatable about an axis defined by each of said plurality of spindles. In an alternative embodiment, the massage elements are integrally formed with the resiliently flexible support element and are substantially rounded in shape.

The invention is explained in more detail below with reference to some drawings. These show:

FIG. 1 a supporting element with massage elements;

FIG. 2 a supporting element having spindles with right-angle bends that hold massage elements;

FIG. 3 a supporting element with side-wings situated at an angle, with massage elements that are offset in height with respect to the central portion;

FIGS. 4A–4D various shapes for massage elements in cross section;

FIGS. 5A–5E various shapes for massage elements in longitudinal section.

The exemplary embodiments specified later on begin with the backrest of a motor-vehicle seat that has a support element 1, which by means of a motor drive can be adjusted in its degree of camber and at the same time can be adjusted in height by a motor drive as well. Such backrests are familiar, for example, from DE 43 14 325, which corresponds to U.S. Pat. No. 5,704,687, to the same inventor as the present invention incorporated herein by reference, of which the present application is a continuation.

Figure 6:
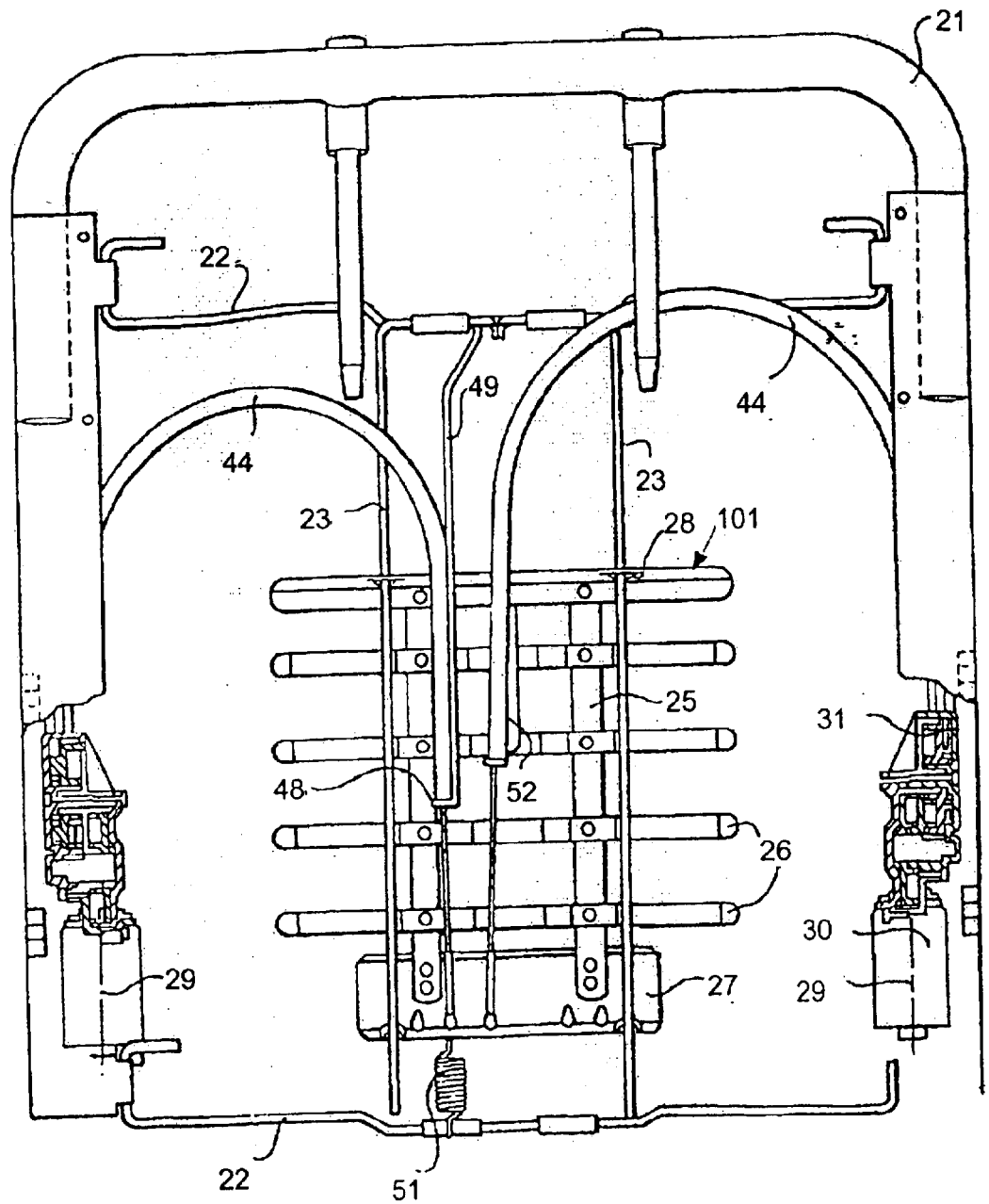
FIG. 6 illustrates a frame of a back rest including a mechanism for adjusting the level of the support element and an apparatus for adjusting the arching of the support element.

A back rest schematically illustrated in FIG. 6, comprises the frame 21 in which between two transverse struts 22 a guide composed of two rods 23 parallel to one another is provided for the support element 101 which is to be moved up and down the guide.

The support element 101 can, as illustrated in FIG. 6, comprise two resiliently flexible longitudinal strips 25 which are parallel to one another and which are interconnected by spaced apart transverse strips 26. At the upper or lower end of the support element 101 reinforced strips or a reinforcement panel 27 may be provided, preferably connected to sliding elements 28 which slide on the rods 23. Additionally, the support element 101 shown in FIGS. 1-3 can be utilized with the backrest shown in FIG. 6. The support element 101 may be made of optional material, even plastics or sheet metal and combinations thereof in a plurality of parts or in one piece, e.g., be punched out. The support element 101 may also comprise additional support elements, not illustrated, which serve to support the lower back region and are fitted to the support element 101 as separate parts or can be made integrally therewith.

Figure 7:
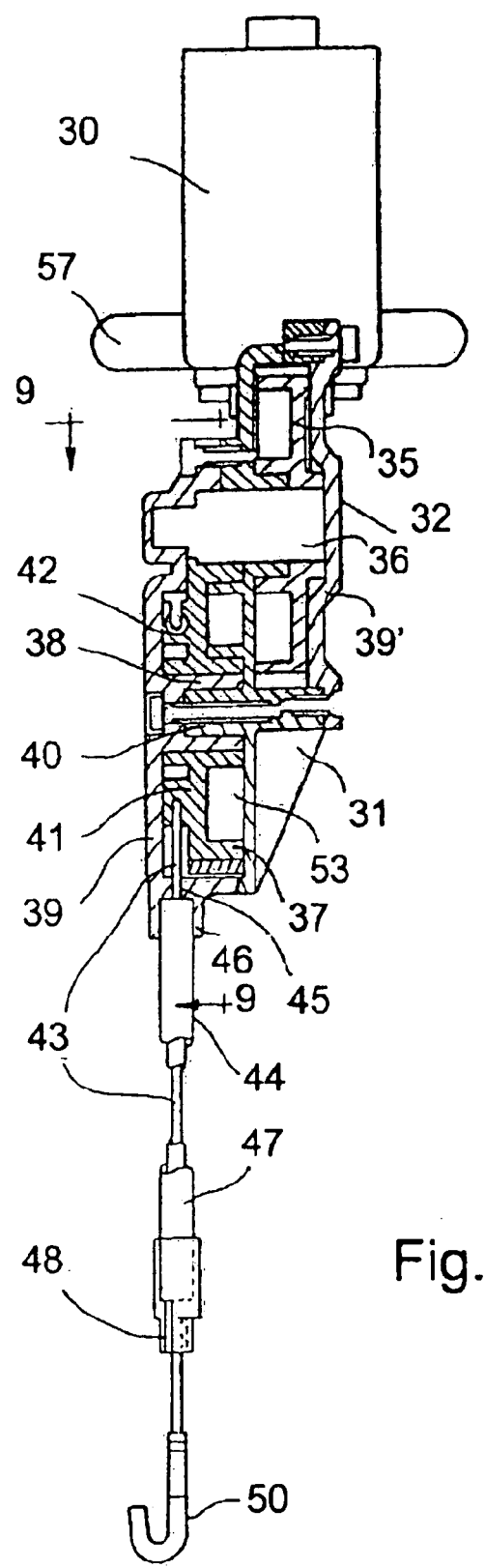
FIG. 7 is an adjustment mechanism in partial longitudinal section.
Figure 8:
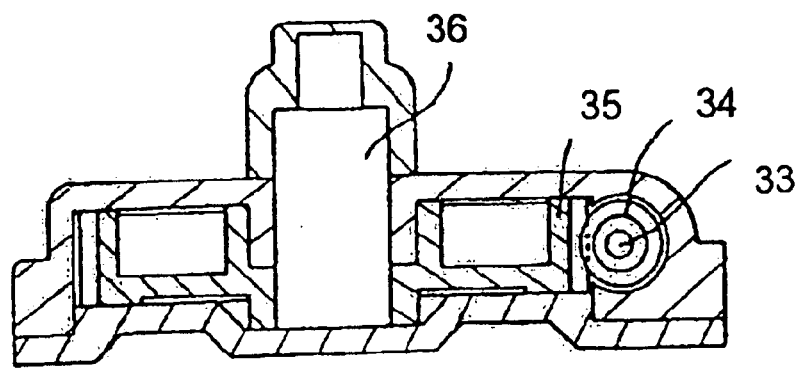
FIG. 8 is a section through a worm gear, a gear wheel and pinion of the gear mechanism of an adjustment mechanism.

To each of the side beams of the frame 21 an electric motor 29 is fitted. A casing 30 is immovably connected to a housing 31 of a gear transmission 32. The electric motor 29 comprises a drive shaft 33 (FIG. 8) on which a worm 34 is mounted, projecting into the gear box 31 and being in engagement with the worm gear 35 provided therein. In the central axis of the gear wheel 35, a pinion 36 is mounted irrotationally in relation to the worm gear 35. That portion of the pinion 36 which projects beyond the worm gear 35 and beyond the cover portion of the gear box 31 is in tooth engagement with a gear wheel 37 which, in the working example according to FIG. 7, is rotatably mounted on a shaft or axle 38. In the working example, the rotating axle 38 is manufactured integrally with a cover 39 which closes the gear box 31. It stands to reason that the axle 38 can also form part of the casing 31 or be fitted as a separate part to the cover 39 or the gear box 31. In order to facilitate the assembly, the gear box 31 comprises a cylindrical projection 40 which facilitates a centrally aligned application of the cover 39 which comprises an appropriate elongate aperture for accommodating the cylindrical projection 40. The tooth wheel 37 on that side which faces the cover 39, carries a reel 41 which in the working example, is manufactured as an integral part of the gear wheel 37. That part of the gear box 31 in which the worm gear 35 with the pinion 36 is fitted, is covered by a cover 39' so as to facilitate access thereto. The covers 39,39' are fitted to the gear box 31 by way of screws in the working example; however, they may also be of different design, e.g., designed as snap closures.

The reel 41 may also be fitted to the gear wheel 37 in a releasable manner, it thereby being made possible to employ reels 41 of different diameters which, as will be explained further below, permits the attainment of variable adjustment ranges. Reels 41 having different diameters may, however, also be interchanged as a single component integrally combined with the gear wheel 37. The reel 41 comprises on it periphery a guide groove and at least one receiving aperture 42 for receiving the enlarged end of a sheathed cable 43 of a Bowden cable arrangement 44. A passage means 45 is provided in the cover 39 which terminates in a receiving sleeve 46 in a projection of the cover 39. The receiving sleeve 46 serves to receive the one end of the sheath 47 of the Bowden cable arrangement 44.

The opposite end of the sheathing 47 is accommodated to a further receiving bush 48 which in the apparatus for the level adjustment of the support element 101 is fitted to the bracket 49 (FIG. 6) which is connected to the transverse strut 22 and is fixed parallel to the rod 23. The free end of the sheathed cable 43 passing through the receiving bush 48 terminates, according to the exemplified embodiment, in a hook 50 (FIG. 7), hooked into the lower reinforcement panel 27 of the support element 101. Between the reinforcement panel 27 and the lower transverse strut 22 of the frame 21, a return spring 51 is suspended, it also being possible for a plurality of springs being provided to draw the support element 101 towards the lower transverse strut 22. Constructions are also feasible in which the support element 101 is downwardly drawn by the Bowden cable arrangement and is pushed upwardly by the springs (not illustrated).

In the apparatus for adjusting the arching or bowing of the support element 101, the second receiving bush 48 for the sheathing 47 of the Bowden cable arrangement 44 is fixed in the upper region of the support element 101, optionally by way of an extension 52. The one sheathed cable 43 is hooked by means of its hook 50 to the lower edge of the reinforcement panel 27.

Figure 9:
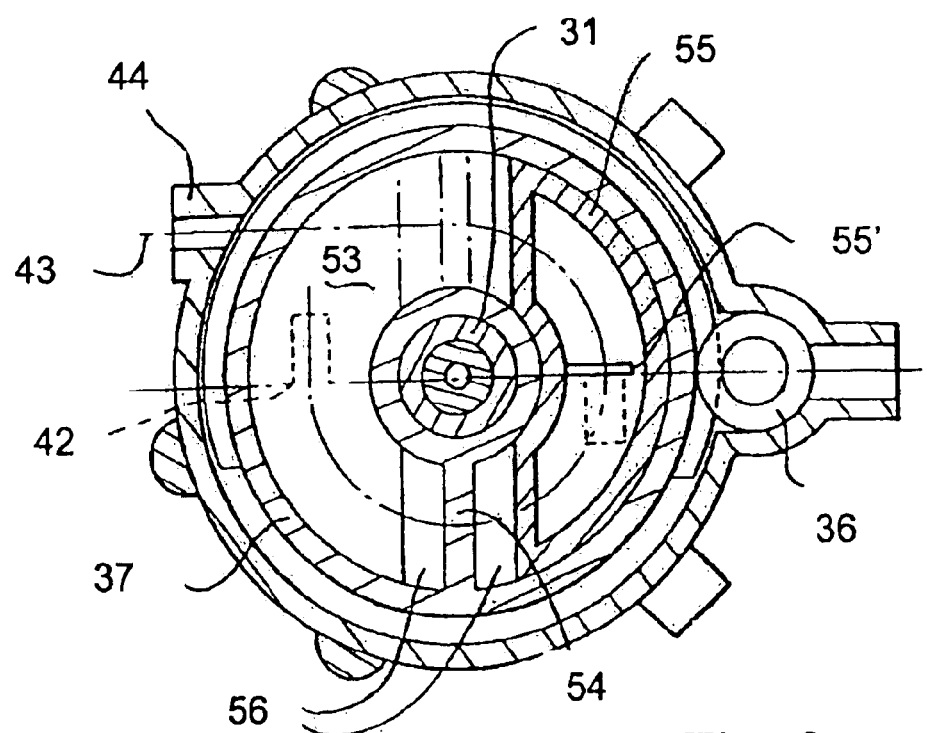
FIG. 9 is a section taken along line 9—9 of FIG. 7.

The gear wheel 27 comprises a circular groove 53 starting from its underside. A projection, which in the working example is designed as a web 54 (FIG. 9), projects into the groove 53. The web 54 is fitted on both sides with a buffer 56 of optional suitable material, e.g., rubber. In the region of the groove 53 a stop member 55, the stop surfaces of which may be close together or at a certain distance from one another, as shown as stops 55,55' in FIG. 9, is provided in the gear box 31. The stop 55 may be used to adjust the winding range for the sheathed cable 43 onto the reel 41, at will, up to almost 360°. One position of the sheathed cable 43, although positioned in a different plane, is shown in dash-dotted lines in FIG. 9.

By the arrangement and design of the stop 55,55' or its stop surfaces, as well as the size of the diameter of the reel 41, the winding range and thereby the displacement range can be adapted to the particular desired length, according to the desired magnitude of the level adjustment or arching adjustment. An additional possibility for adjustment will exist if one or both receiving bushes 46,48 are fitted adjustably, e.g., by screwing.

Instead of one or a plurality of return springs 51 in the apparatus for level adjustment it is also possible to provide a second identical level adjustment means which, although being somewhat more expensive, offers the advantage that the restoring forces of the spring(s) 51 need not be compensated for.

Instead of an electric motor 29 it is also possible for a handle, e.g., a hand reel 57 (indicated in FIG. 7) or a lever to be fitted to the drive shaft 33, optionally connected to a ratchet means which, where applicable, may be fitted with a releasable ratchet pawl.

By way of example a gear ratio for the above described gear transmission 32 may be provided between the worm 34 and the worm gear 35 of 1:90 in the first stage (plane) and between the pinion 36 and the gear wheel 37 of 1:6 in the second stage (plane), mounting to an overall ratio of 1:540, from which it will be clear that only a minor energy exertion is needed for adjusting both the level as well as the arching of a support element, where in each case a maximum extent of adjustment is prescribed in a defined manner by the stops 55,55', so as to prevent damage to the support element 101 and other components of the apparatus by exercising adjustment forces which are to high, e.g., when adjusting manually.

In order to ensure a continuous or periodic motion for the massage based on the invention, a switching arrangement is provided that, in accordance with an initial solution to the problem, involves two limit switches, one in an upper and one in a lower location of the supporting element, which are used to give a reversal of motion of the motor drive. This reversal of motion is preferably buffered in order to also make sure that the system can be continuously operated for long periods of time. By varying the setting of the limit switches, the path of motion needed or desired at any particular time can be changed. In a different solution that does not entail a reversal of motion of the motor, the driving is effected via a non-reversing eccentric-cam arrangement, by way of which the propulsion is converted to up-and-down or forward-and-back motions. Such switching arrangements and drives are generally familiar, so that they are not specified here any further.

The exemplary embodiments elucidated below only concern backrests, with it being clear that they can be used in a similar way also for the vehicle seat per se.

Figure 1:
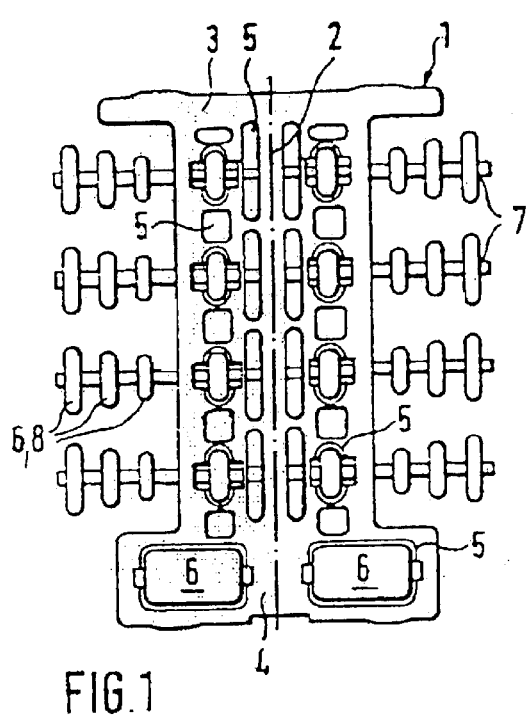
Figure 2:
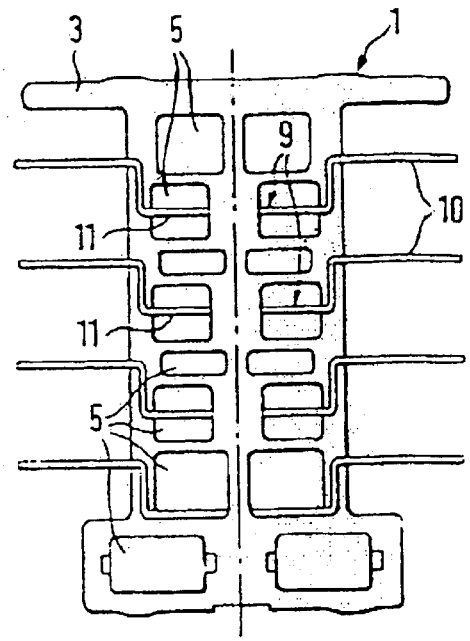
Figure 3:
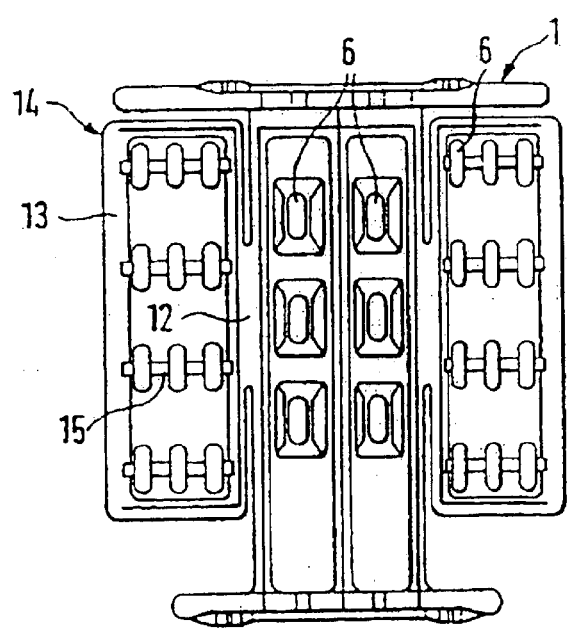
Figure 4A:
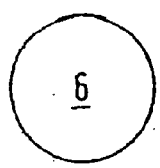
Figure 4B:
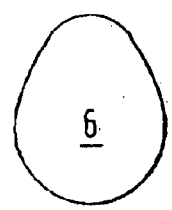
Figure 4C:
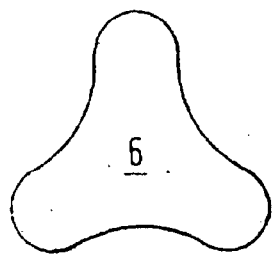
Figure 4D:
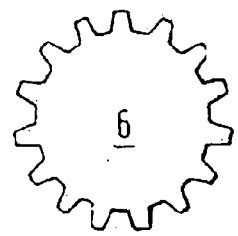
Figure 5A:
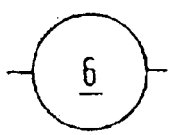
Figure 5B:
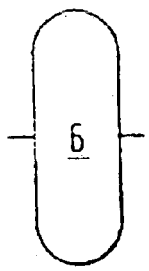
Figure 5C:
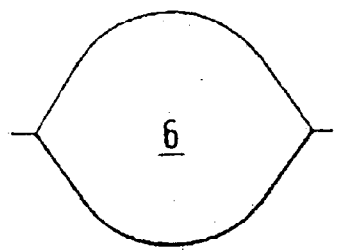
Figure 5D:
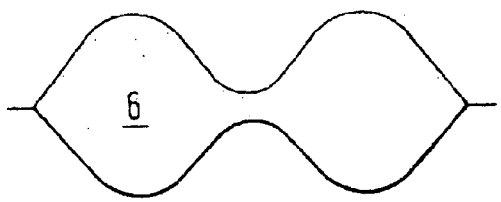
Figure 5E:
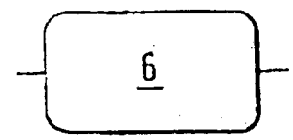

Each of the supporting elements 1 shown in FIGS. 1, 2, and 3 has a central portion 2, which ends at the top in a terminal shoulder 3 that is extended laterally in each case, and at the bottom in a terminal portion 4. The latter has the same design in FIGS. 1 and 2 and a different design in FIG. 3.

The supporting element 1 along with its terminal shoulder 3 and its terminal portion 4 is placed in such a way that it can be arched out and varied in height upon the frame of the backrest, which is not depicted, either directly or indirectly via a plate. However, the supporting element 1 can also be arranged to be on a backing plate, on which it can be arched out, with it being possible for the backing plate itself to be variable in height, and possibly also to be movable forward and backward at right angles to this. These variants are not shown either.

Each supporting element 1 is manufactured as a flexionally elastic piece out of a metal or plastic material or out of combinations of these, for example by means of punching out from a plate or a sheet, by riveting processes, or in the case of plastic also by compression molding. Each supporting element 1 has numerous recesses 5 in the central portion 2. The recesses 5 serve the purpose, for one thing, of reducing the weight, and for another that of accommodating massage elements 6 that project beyond the surface of the supporting element 1.

The massage elements 6 can be manufactured as projections that are rigidly affixed to or molded out of the supporting element 1, preferably with these having a spherically shaped surface, and with these positioned on the central portion 2 and the optionally configured side pieces. If the massage elements 6 are of the stationary type, then when there are movements an increased friction arises between the motions of the supporting element 1 and the not-shown seatcover material of the backrest or the seat, which necessitates a larger power output from the drive, and on the other hand this results in an increased material wear on the rubbing surfaces.

For this reason, it is preferable for the massage elements 6 to be designed in the form of rotatable solids of revolution.

In the exemplary embodiment shown in FIG. 1, four spindles 7 are provided at equal spacings from one another on the central portion 2 and extending laterally beyond this portion, on which are seated in rotatable fashion, in the central portion 2, two or more disks 8 that are round in cross section. Additional disks 8 are positioned so as to be rotatable on the portions of the spindles 7 that jut out laterally, but these have an increasingly larger diameter the further they are away from the central portion 2. This increasingly larger diameter has the effect of providing a side support to a person's back as it rests in the backrest. In this embodiment, all the massage elements are in the shape of disks 8 that lie in a spindle line.

In the exemplary embodiment shown in FIG. 2, the supporting element 1 has four spindles 9, the free spindle necks 10 of which have been offset. Because of this the massage elements that are located to the side of the central portion 2, which are not drawn in here, are always at a height different from the massage elements arranged within the central portion 2 on the central spindle portions 11.

FIG. 3 shows one variant of a supporting element 1, in which the central portion 2 is connected in each case via a hinge 12 to side pieces 14, which have their own self-contained framework 13. By means of the connection via a hinge 12 that is relatively short in height, the side pieces 14 do not get very bowed or do not get bowed at all when the central portion 2 is bowed out. That is, here practically all of the massage elements of the side pieces 14 continue to be in contact with a person's back even when a particularly extensive arching of the central portion 2 has been initiated and possibly the massage elements positioned at the top and bottom ends of the central portion 2 may still be applying only a slight contact pressure. The massage elements 6 in the side pieces 14 are such as to rotate on four spindles 15 seated in each case within the frame 13.

The cross section of the massage elements 6 can be—when viewed at right angles to their axis of rotation—circular, egg-shaped, that of a rounded triangle or polygon, a rounded star shape, or a fluted body, and can be—when viewed in parallel with the axis of rotation—globular, disk-shaped, wave-like, or cylindrical, or any combinations of these. They can be centrally or eccentrically rotatable on a spindle, either individually or after being connected rigidly with other elements. But they can also be provided in a rigid arrangement on a spindle, whereby the spindle itself is able to rotate. In the case where the spindle is rotatable, this can be set rotating via a drive belt or by means of a gear wheel provided on it along with a synchronous belt or a rack-and-pinion drive. When the spindle itself can be driven, an eccentric arrangement of the massage elements is particularly advantageous, since in that case different pressures can be applied to contiguous areas of the back.

The massage elements can be made out of rubber, wood, plastic, metal, or also out of any desired combinations of these.

In order to facilitate assembly, the spindles 7, 9 or even 15 can be attached via clip connectors into which they can be snapped, whereby preferably the massage elements can be pre-mounted, either as rotatable elements or in rigid fashion, and possibly also several combined into a single block, as desired. The side pieces with their spindles can also be provided so as to form an angle with the central portion. The side spindles can also be arranged so as to form a direct line with or else be offset 90 from the central portion.

The process takes the following course: at regular intervals the person sitting on the seat containing the device switches on the drive, whereby the supporting element is put into a continuous up-and-down motion. This causes the massage elements across the surface of the backrest or the seat to roll along or move over the body parts touching them, in the course of which they exert a pressure that is felt as a massage. This massaging effect can be varied on the one hand by having a different design for massage elements that are positioned above others and below yet others as well as for elements in the offset portion, and also by giving them different shapes and central or eccentric orientations as bodies of revolution. Another way to intensify or vary the massage effect can be achieved by imparting to the supporting element and thus to the massage elements an additional forward-and-back movement roughly at right angles to the up-and-down motion. This forward-and-back motion can be made to be uniform over the height of the device. But by varying the amount of arching this motion can also be designed to be greater at some points and less at certain other points. An additional effect can be achieved by means of variously shaped massage elements, especially in the case of an eccentric positioning, if the individual spindles with massage elements rigidly attached to them are themselves made to rotate.

What is claimed is:

1. A lumbar support adapted for mounting in a seat, comprising:

a resiliently flexible support element having a first end and a second end, said first end being adapted to be drawn towards said second end thereby varying a degree of arching of said resiliently flexible support element;

a plurality of spindles mounted on said resiliently flexible support element; and a plurality of massage elements, wherein each of said plurality of massage elements is mounted on one of said plurality of spindles;

wherein each of said plurality of massage elements is rotatable about an axis defined by each of said plurality of spindles.

2. The lumbar support of claim 1, wherein said first end and said second end of said resiliently flexible support element are slidably connected to at least one guide rod;

said first end of said resiliently flexible support element is immovably connected to a traction cable;

said traction cable is operatively connected to a drive motor; and said drive motor varies a length of said traction cable, thereby varying a degree of height of said resiliently flexible support element.

3. The lumbar support of claim 1, wherein said first end and said second end of said resiliently flexible support element are slidably connected to at least one guide rod;

said first end of said resiliently flexible support element is immovably connected to a traction cable;

said second end of said resiliently flexible support element is slidably connected to said traction cable;

said traction cable is operatively connected to a drive motor; and said drive motor varies a length of said traction cable, thereby varying a degree of arching of said resiliently flexible support element.

4. The lumbar support of claim 1, wherein a plurality of limit switches located on said resiliently flexible support element serve to regulate a range of motion of said resiliently flexible support element.

5. The lumbar support of claim 1, wherein said resiliently flexible support element is moved by a non-reversing eccentric-cam driven by a motor.

6. The lumbar support of claim 1, wherein said mounting in said seat is in a backrest.

7. The lumbar support of claim 1, wherein said mounting in said seat is in a seat bottom.

8. The lumbar support of claim 1, wherein said seat is a car seat.

9. The lumbar support of claim 1, wherein each of said plurality of massage elements is nonrotatably mounted to each of said plurality of spindles.

10. The lumbar support of claim 1, wherein each of said plurality of massage elements rotates freely on each of said plurality of spindles.

11. The lumbar support of claim 1, wherein a free neck of each of said plurality of spindles is offset such that massage elements attached to said free neck are offset from massage elements attached to a central portion of said plurality of spindles.

12. The lumbar support of claim 1, wherein each of said plurality of massage elements is eccentrically mounted on each of said plurality of spindles.

13. The lumbar support of claim 1, wherein each of said plurality of massage elements is made from a material consisting of rubber, wood, plastic, or metal.

14. The lumbar support of claim 1, wherein each of said plurality of massage elements has a cross-section, when viewed at a right angle to an axis of rotation, having a shape selected from the group consisting of circular, egg-shaped, a rounded triangle, a rounded polygon, a rounded star shape, or a fluted body.

15. The lumbar support of claim 1, wherein each of said plurality of massage elements has a cross-section, when viewed parallel to an axis of rotation, having a shape selected from the group consisting of globular, disk-shaped, wave-like, or cylindrical.

16. The lumbar support of claim 1, wherein a diameter of each of said plurality of massage elements varies according to a distance of said massage element from a vertical centerline of said flexible support element.

17. The lumbar support of claim 1, wherein said resiliently flexible support element comprises a central portion and a pair of side pieces.

18. The lumbar support of claim 17, wherein said side pieces are connected to said central portion.

19. The lumbar support of claim 18, wherein said side pieces are hingedly connected to said central portion.

20. The lumbar support of claim 18, wherein a degree of arching of said side pieces remains substantially unchanged when the degree of arching of said central portion of said resiliently flexible support element is varied.

21. A lumbar support adapted for mounting in a seat, comprising:

a resiliently flexible support element having a first end and a second end, said first end being adapted to be drawn towards said second end thereby varying a degree of arching of said resiliently flexible support element; and a plurality of massage elements, wherein each of said plurality of massage elements is integrally formed with said support element;

wherein each of said plurality of massage elements is substantially rounded in shape.

22. A lumbar support adapted for mounting in a seat, comprising:

a resiliently flexible support element having a first end and a second end, said first end being adapted to be drawn towards said second end thereby varying a degree of arching of said resiliently flexible support element;

left and right side pieces, hingedly connected to said resiliently flexible support element, such that when the degree of arching of said resiliently flexible support element is varied, the degree of arching of said left and right side projections does not vary substantially;

a plurality of spindles mounted on said resiliently flexible support element and said left and right side projections; and a plurality of massage elements, wherein each of said plurality of massage elements is mounted on one of said plurality of spindles;

wherein each of said plurality of massage elements is rotatable about an axis defined by each of said plurality of spindles.

23. The lumbar support of claim 22, wherein said left and right side pieces are hingedly connected to said resiliently flexible support element in a region of said resiliently flexible support element substantially midway between said first end and said second end.

* * * * *